(12) United States Patent
Makowski

(10) Patent No.: US 7,607,253 B2
(45) Date of Patent: Oct. 27, 2009

(54) LURE LIGHT FOR ILLUMINATING LURE WHILE FISHING

(76) Inventor: James Makowski, 14934 W. Bay Rd., Sterling, NY (US) 13156

(*) Notice: Subject to any disclaimer, the term of this patent is extended or adjusted under 35 U.S.C. 154(b) by 0 days.

(21) Appl. No.: 11/507,129

(22) Filed: Aug. 21, 2006

(65) Prior Publication Data
US 2007/0039228 A1 Feb. 22, 2007

Related U.S. Application Data

(60) Provisional application No. 60/709,915, filed on Aug. 22, 2005.

(51) Int. Cl.
A01K 75/02 (2006.01)
A01K 85/01 (2006.01)

(52) U.S. Cl. .......... 43/17.5; 43/17.6

(58) Field of Classification Search .......... 43/17.5, 43/17.6, 42.06
See application file for complete search history.

(56) References Cited

U.S. PATENT DOCUMENTS

| | | | | |
|---|---|---|---|---|
| 3,824,731 A | * | 7/1974 | Sandschaper | 43/17.5 |
| 4,010,567 A | * | 3/1977 | MacMillan | 43/17.5 |
| 4,109,405 A | * | 8/1978 | Ito | 43/17.5 |
| 4,437,256 A | * | 3/1984 | Kulak | 43/17.5 |
| 4,727,674 A | | 3/1988 | Garr | 43/17.6 |
| 4,839,983 A | * | 6/1989 | Pippert | 43/42.06 |
| 4,941,281 A | | 7/1990 | Vitale et al. | 43/43.12 |
| 5,018,297 A | * | 5/1991 | Kennedy, Jr. | 43/42.28 |
| 5,159,774 A | * | 11/1992 | Bennis et al. | 43/17.5 |
| 5,412,897 A | * | 5/1995 | Smith | 43/4 |
| 5,651,209 A | * | 7/1997 | Rainey | 43/17.5 |
| 5,675,927 A | * | 10/1997 | Kloos | 43/17.5 |
| 5,987,802 A | * | 11/1999 | Caprio | 43/17.5 |
| 6,684,557 B1 | * | 2/2004 | Yu | 43/17.6 |
| 7,137,222 B2 | | 11/2006 | Aanenson | 43/42.31 |
| 2004/0216355 A1 | * | 11/2004 | Gore | 43/17.5 |

* cited by examiner

Primary Examiner—Kurt Rowan
(74) Attorney, Agent, or Firm—Bernhard P. Molldrem, Jr.

(57) ABSTRACT

A lure light device is positioned on a fish line ahead of a fishing lure to illuminate the lure when used at depths or at night. The device has a watertight body containing an LED or lamp device and power cells. A lens on the device contains the light so that it concentrates on the lure. An additional chamber can be used for a scent or fish attractant. A switch turns the light on when a cable has tension from the drag of the lure.

5 Claims, 3 Drawing Sheets

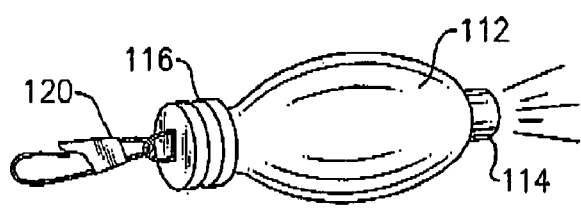
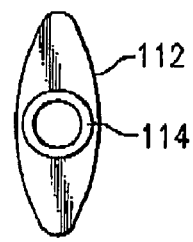
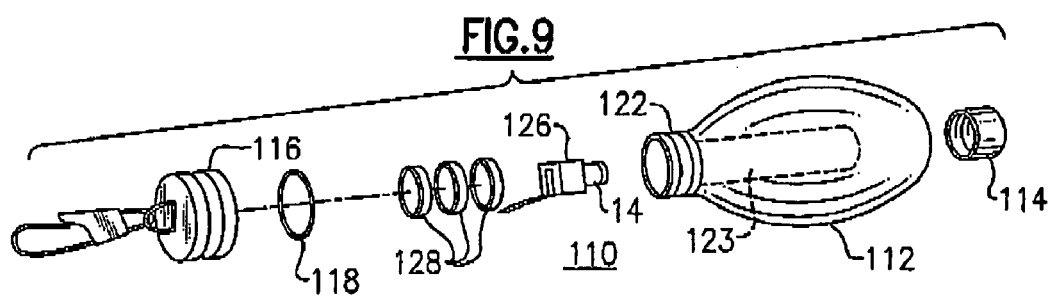
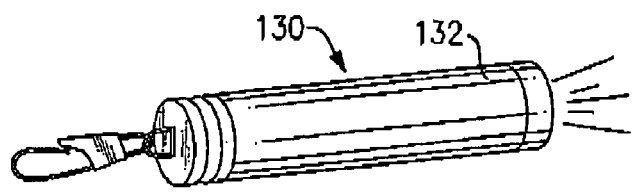
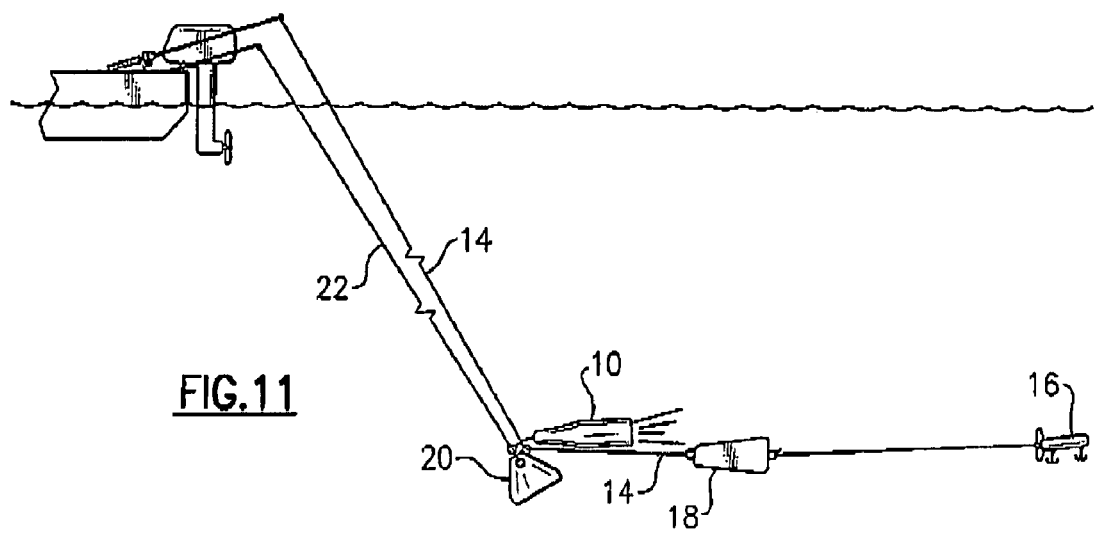

LURE LIGHT FOR ILLUMINATING LURE WHILE FISHING

This application claims priority of provisional application 60/709,915, Aug. 22, 2005.

BACKGROUND OF THE INVENTION

This invention relates to a method and device for illumination of colorful lures, by means of a water-tight or waterproof light that attaches to the a part of the fishing line, i.e. to the line itself, or to the downrigger cable or a weight ahead of the lure.

The invention is more particularly concerned with a small lighting device that can shine a beam of light on a lure underwater, which can be a steady light, flashing light, white, or any of various colors, or can be black light for illuminating a phosphorescent lure.

Many types of sport fish, such as salmon, may be present at any of various depths, especially in deep water such as in the Great Lakes. At significant depths, daylight fails to penetrate. At those depths, a fishing lure would be hardly visible.

OBJECTS AND SUMMARY OF THE INVENTION

It is an object to provide a means for illuminating lures when underwater, and which is durable, simple to use, and can be kept in a tackle box and installed on the fishing line when needed.

In accordance with an aspect of this invention, a lure light has a water-tight housing that contains a small lamp, e.g., an LED or laser diode, or in some cases could be a small incandescent lamp. This is powered by a stack of two or more small watch battery cells. The device can include a switch to turn it on when it is being pulled through the water, i.e., when trolling. In some preferred versions, there can be a chamber containing wicking that holds a scent and with small openings or apertures that allow the scent into the water to attract fish. There may also be a chamber containing small shot or other items to create clicking or rolling sounds when the device is pulled through the water.

In one possible version, at the leading side of the device there is a screw closure with a swivel clip for attaching to the line, and which closes over an O-ring seal. This can be tightened down to turn it on and twisted the other direction to turn it off. Otherwise, there can be any other sort of switch, such as a pressure switch that turns on if the device is being trolled below some depth, e.g., at 30 feet or more, or there can be a water sensor switch that turns on when the lure light is immersed.

The lure light can have interchangeable lenses at the lighted end, so that the color can be changed as needed for different fishing conditions. In that case, the lamp or lighting device could be a so-called "white" LED, or could be incandescent.

In practice, the lure light can be attached at the down-rigger weight or Dipsy Diver, i.e., at the release, where it will light the fishing tackle that trails behind, such as a "flasher" as well as the lure or bait. Alternatively, the lure light can be attached at the flasher, or onto the fishing line about 16 to 24 inches ahead of the lure.

A few preferred embodiments of this invention will be described below, with reference to the accompanying Drawing figures.

BRIEF DESCRIPTION OF THE DRAWING

FIG. 7 is a perspective view of the lure light according to another embodiment of the invention.

FIG. 8 is a proximal view of the lure light of this embodiment.

FIG. 9 is an exploded assembly view of the lure light of this embodiment.

FIG. 10 shows an alternative embodiment.

FIG. 11 is another environmental view illustrating implementation of this invention.

DETAILED DESCRIPTION OF THE PREFERRED EMBODIMENT(S)

Figure 1:
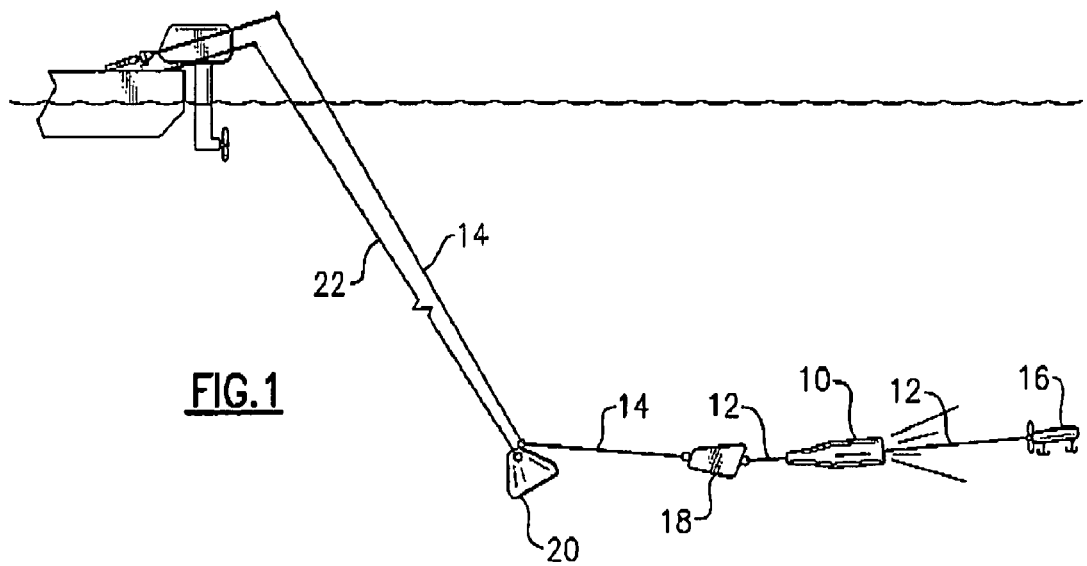
FIG. 1 is an environmental view for explaining the use of the lure light according to one embodiment of this invention
Figure 2:
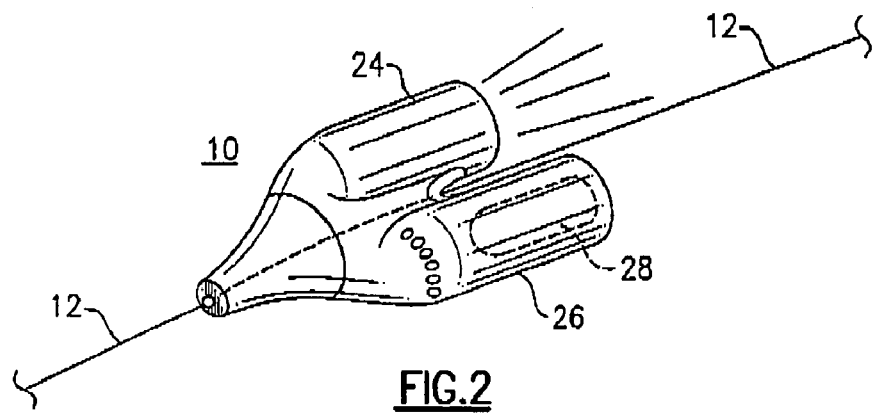
FIG. 2 is a perspective view of the lure light this embodiment.
Figure 3:
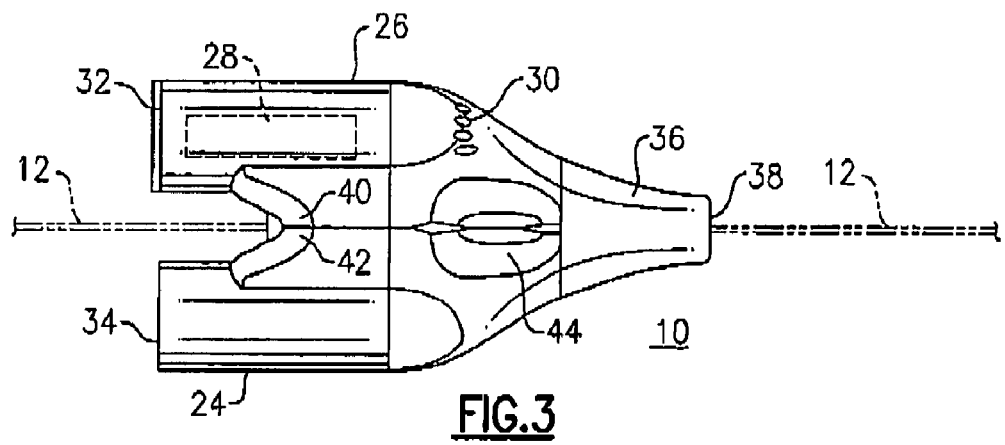
FIG. 3 is a top plan view thereof.
Figure 4:
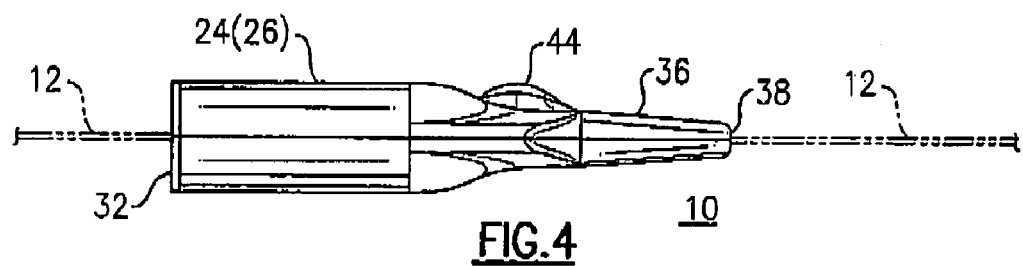
FIG. 4 is a side view thereof.
Figure 5:
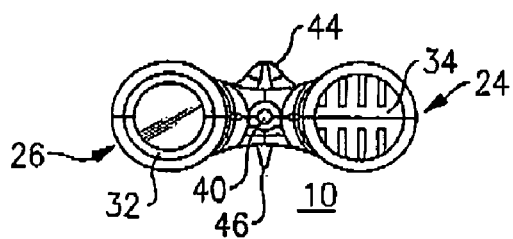
FIG. 5 is a is a proximal view, i.e., rear view of the lure light of this embodiment.
Figure 6:
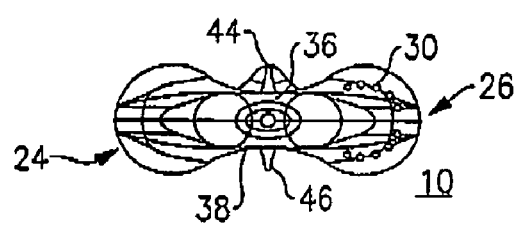
FIG. 6. Is a distal or front view thereof.

With reference to the Drawing, and initially to FIGS. 1 and 2, a lure light 10 according to one embodiment of this invention is mounted on a wire leader 12 on a fishing line 14, in advance of a lure 16. The lure light device 10 is placed in a position on the leader 12 to illuminate the lure 16, or alternately to illuminate a flasher placed between the line and the leader. In this example, the fishing line is taken down to depth by means of a downrigger weight or Dipsy Diver 20 or other similar mechanism that is held by a separate wire 22 to the boat. The line 14 is held to the downrigger equipment by means of a release mechanism, so the line pulls free of the downrigger if a fish strikes. The lure light could be used with any type of lure, e.g., plug, fly, spoon, spinner, or cut bait, but is especially useful when the natural light illuminating the lure is very weak, i.e., at significant depths or at night. Here the flasher 18 is located in advance of the lure light, but the flasher could be placed between the lure light and the lure. Alternatively, and additional lure light could be used in advance of the flasher as well.

As shown in FIG. 2, the lure light device 10 has a case formed as a pair of generally cylindrical chambers or barrels 24, 26. One of these barrels 24 is a light cylinder that contains an LED and a number of power cells, e.g., watch battery cells. The other barrel 26 is a scent cylinder that holds a piece of wicking 28 that contains a scent or fish attractant. There are small openings or apertures 30 that permit the water to flow through and pick up this scent. The wire leader 12 passes through an opening in a front end or nose 32 of the case and through an opening at the rear between the two cylinders.

Details of the case of this lure light can be seen in FIGS. 3 to 6. As aforementioned, the lure light has a case formed of a light cylinder barrel 24 and a scent cylinder barrel 26.

The scent cylinder or barrel 26 has apertures 30 at its anterior or distal end, and there is a cap 32 with closing off the proximal or posterior end. The cap can be removed, and the wick 28 can be pulled out and treated with a few drops of a fish attractant (scent), and then wick and cap can be replaced. The apertures allow a small quantity of water to flow in and out of the cylindrical chamber so that the attractant is presented to fish in the vicinity.

The light cylinder or barrel 24 has a lens 34 covering the proximal or posterior end, and sealing off the cylindrical chamber, which contains one or more LEDs, a set of two or three watch battery cells, and optionally, electronics for flashing or other effects. The lens 34 can serve to confine the beam of light so that it concentrates on the lure. A colored lens may be used.

The body of the lure light also has a forward pointed nose 36 positioned between the two cylinders 24, 26. There is an opening 38 at the forward tip of the nose, and there is another opening 40 located at the rear of the lure light between the two cylinders or barrels. A steel cable that serves as leader 12 passes through a bore or passage between the front and rear openings 38 and 40. The steel cable runs through the device, and connects to the fish line 14 in advance of the device and to the lure 16 behind. There is a switch mechanism 42 located within the device that turns on when there is tension on the cable 12 from the lure 16 being dragged through the water. This switch mechanism can be off normally.

Also, within the lure light device 10 is a small chamber containing round shot, which will rattle as the device moves through the water. The sound being produced is believed to attract fish. At the upper side of the nose 36 is a bulge or dome-like protuberance 44, and there is a fin or skeg 46 projecting from the underside of the nose 36 (see FIGS. 5 and 6). These features help to stabilize the lure light and the lure as they move through the water.

In this embodiment, the lure light device 10 has a negative buoyancy, and the device is typically placed a distance of 24 to 36 inches in advance of the lure 16.

The lure light device in this case has dimensions of about 3¾ inches long, about 2 inches across, and about ¾ inches thick, that is, the barrels have a diameter of about ¾ inch. However, the invention is not limited to lure light devices of that size, and these may be larger or smaller, depending upon the equipment and fishing tackle that it is used with.

The device can be of different shapes and configurations, and in some embodiment can omit the shot chamber or can omit the scent barrel.

In one possible arrangement, an additional lure light 10 can attached to the release of the downrigger, where its light can illuminates a flasher in advance of the other lure light, with the flasher being a flat blade type of equipment, and positioned several feet behind the downrigger.

An alternative embodiment is illustrated in FIGS. 7, 8, and 9. As shown there, a lure light 110 has a watertight plastic body 112, with a transparent lens 114 at the proximal or lure end, and a cap 116 at the distal or line end. In this embodiment, there is an O-ring seal 118 that is compressed by the cap, which is threaded and screws tight against the body. A swivel clip 120 on the cap 116 is provided for attaching the lure light to the line or another part of the fishing tackle. Here, as shown in FIG. 8, the body 112 is taller than it is wide, so that it has a stable trailing action in the water. The device may be about ¾ inch to one inch in length. The body 112 should be tapered so it cuts through the water.

As shown in the exploded assembly view of FIG. 9, the body 112 has male threaded neck 122 on which the cap and O-ring are placed, and this neck 122 leads to an internal cavity 123. An LED 124 and associated electronics package 126 fit into the cavity 213, together with a stack of small power cells 128, 128. Here, the electrical circuit of the cells 128, package 126, and LED 14 will close to turn on when the cap 116 is tightened down. This also compresses the O-ring 118 and makes the device watertight. The power cells 128 are small and inexpensive and can be changed out when they are depleted.

As shown at the proximal end, the lens 114 is fitted into a socket 129, so it can be removed and replaced with a different lens. Favorably, the device is provided with a number of lenses 114 of different colors, so the color can be changed to suit fishing conditions. In such case, the LED can be a white LED generating a spectrum of visible wavelengths, or a small incandescent lamp could be substituted.

An alternative design of a lure light 130 is shown in FIG. 10. Here, the device has a body or case 132 that is in the form of a long, slim cylinder. Many other shapes and sizes could be used.

The lure light 110 or 130 of this invention is placed in a position to illuminate the lure, and can be positioned as mentioned before in advance of the lure or a attached to the flasher as described before with reference to FIG. 1. The lure light may be attached at the downrigger or Dipsy Diver, or an additional lure light may be placed at that location.

FIG. 11 shows a deep water fishing arrangement where the lure light device 10 is affixed to the downrigger 20 on the downrigger wire 22, and is separate from the fishing line 14. In this position, the light illuminates the lure 16 and the flasher 18. The lure light device 10 remains on the downrigger when a fish is reeled in.

The lure light device of this invention can be used with any type of lure, e.g., plug, fly, spoon, spinner, or with live bait or cut bait.

In a preferred embodiment, the lure light is designed for a steady beam, but in other versions the lure light could produce chopped, flashing light. There can be multiple LEDs emitting different colors, or flashing from one color to another. Also, instead of the switch arrangements as described, there can be a water sensitive device to turn on in the presence of water, or a pressure switch to turn on when the device is at some depth, e.g., at fifteen feet or below. As an additional feature, the lure light can contain a sounder device as well to produce sounds such as chirps or clicks. This can be electrically powered from small cells.

While this invention has been described in detail with reference to a few selected embodiments, the invention is not limited to those embodiments. Rather, many variations would appear to those of skill in the art without departing from the scope and spirit of the invention, as defined in the appended claims.

I claim:

1. A lure light that comprises a watertight body; a lamp device contained in said watertight body and emitting light out a proximal end thereof; means providing electrical power to the lamp device; and means at the opposite or distal end to attach to a fishing rig ahead of and in line with a lure disposed at the end of the fishing line, and positioned so that the light emanating from said lure light shines onto said lure;

said body comprising first and second barrels situated alongside one another, with said lamp device and said means providing electrical power thereto being contained in said first barrel, and wherein said second barrel includes wicking containing a fish attractant scent, such that the scent is diffused into the water ahead of said lure so that the fish attractant scent is presented to fish in the vicinity; and wherein said body has a forward-pointed nose between said first and second cylinders, including a dome-like protuberance at an upper side of said nose, and a skeg projecting from an under side of said nose.

2. A lure light according to claim 1, wherein said body has a passage therethrough, with a cable passing through said passage, the cable being adapted to attach at one end to a fishing line and at its other end to said lure.

3. A lure light according to claim 2, further comprising a switch means for turning the light on in response to tension on said cable.

4. A lure light according to claim 1, wherein said second barrel includes apertures permitting said fish attractant to be presented to fish in the vicinity of the lure light.

5. A lure light according to claim 1, said body including a shot-filled chamber.

* * * * *